United States Patent
Chu

(10) Patent No.: US 12,266,811 B2
(45) Date of Patent: Apr. 1, 2025

(54) SYSTEM AND METHOD FOR A HIGH-PERFORMANCE PRISMATIC LITHIUM-ION BATTERY CELL

(71) Applicant: GM GLOBAL TECHNOLOGY OPERATIONS LLC, Detroit, MI (US)

(72) Inventor: Seung-Woo Chu, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 478 days.

(21) Appl. No.: 17/894,526

(22) Filed: Aug. 24, 2022

(65) Prior Publication Data

US 2024/0072346 A1 Feb. 29, 2024

(51) Int. Cl.

| | |
|---|---|
| H01M 50/211 | (2021.01) |
| H01M 10/647 | (2014.01) |
| H01M 10/653 | (2014.01) |
| H01M 10/6551 | (2014.01) |
| H01M 50/121 | (2021.01) |
| H01M 50/14 | (2021.01) |
| H01M 50/224 | (2021.01) |
| H01M 10/0525 | (2010.01) |
| H01M 10/625 | (2014.01) |
| H01M 50/249 | (2021.01) |

(52) U.S. Cl.
CPC ....... *H01M 50/211* (2021.01); *H01M 10/647* (2015.04); *H01M 10/653* (2015.04); *H01M 10/6551* (2015.04); *H01M 50/121* (2021.01); *H01M 50/14* (2021.01); *H01M 50/224* (2021.01); *H01M 10/0525* (2013.01); *H01M 10/625* (2015.04); *H01M 50/249* (2021.01); *H01M 2220/20* (2013.01)

(58) Field of Classification Search
None
See application file for complete search history.

(56) References Cited

U.S. PATENT DOCUMENTS

2020/0411806 A1* 12/2020 Otsuka ................ H01M 50/105

\* cited by examiner

*Primary Examiner* — Wyatt P McConnell
(74) *Attorney, Agent, or Firm* — Quinn IP Law

(57) ABSTRACT

A system for a high-performance prismatic lithium-ion battery cell is provided. The system includes a battery cell stack including an electrode sub-assembly including a plurality of pairs of anode electrodes and cathode electrodes and including a planar side. The battery cell stack further includes a polymeric shell disposed around the electrode sub-assembly and configured for providing mechanical protection and electrical insulation to the electrode sub-assembly. The battery cell stack further includes a metal foil sheet attached to the polymeric shell and disposed next to and in contact with the planar side of the electrode sub-assembly, wherein the metal foil sheet is configured for exchanging heat with the electrode sub-assembly.

20 Claims, 10 Drawing Sheets

SYSTEM AND METHOD FOR A HIGH-PERFORMANCE PRISMATIC LITHIUM-ION BATTERY CELL

INTRODUCTION

The disclosure generally relates to a system and method for a high-performance prismatic lithium-ion battery cell.

A battery or a battery cell includes an anode, a cathode, a separator, an electrolyte, and an enclosure. A prismatic battery cell includes the enclosure or an outer case, which may be constructed with a metal, polymer, or polymeric film. Polymeric films may be insulative, both electrically and thermally.

SUMMARY

A system for a high-performance prismatic lithium-ion battery cell is provided. The system includes a battery cell stack including an electrode sub-assembly including a plurality of pairs of anode electrodes and cathode electrodes and including a planar side. The battery cell stack further includes a polymeric shell disposed around the electrode sub-assembly and configured for providing mechanical protection and electrical insulation to the electrode sub-assembly. The battery cell stack further includes a metal foil sheet attached to the polymeric shell and disposed next to and in contact with the planar side of the electrode sub-assembly, wherein the metal foil sheet is configured for exchanging heat with the electrode sub-assembly.

In some embodiments, the electrode sub-assembly includes a first electrode sub-assembly, the planar side of the first electrode sub-assembly includes a first planar side, and the polymeric shell includes a first polymeric shell. The metal foil sheet includes a first metal foil sheet. The battery cell stack further includes a second electrode sub-assembly including a second planar side, a second polymeric shell disposed around the second electrode sub-assembly, and a second metal foil sheet in contact with the second polymeric shell and disposed next to and in contact with the second planar side of the second electrode sub-assembly.

In some embodiments, the planar side of the first electrode sub-assembly is adjacent to the second planar side of the second electrode sub-assembly. A center portion of the battery cell stack is defined between the first electrode sub-assembly and the second electrode sub-assembly. The first metal foil sheet is in contact with the first planar side of the first electrode sub-assembly in the center portion. The second metal foil sheet is in contact with the second planar side of the second electrode sub-assembly in the center portion.

In some embodiments, the first polymeric shell and the second polymeric shell collectively encapsulate the first electrode sub-assembly and the second electrode sub-assembly.

In some embodiments, the first metal foil sheet and the second metal foil sheet each are attached to an outer surface of a respective one of the first polymeric shell and the second polymeric shell. The first metal foil sheet and the second metal foil sheet each include a portion extending between the first polymeric shell and the second polymeric shell into the center portion.

In some embodiments, the portions extending between the first polymeric shell and the second polymeric shell each include an adhesive strip configured for attachment to one of the first electrode sub-assembly and the second electrode sub-assembly.

In some embodiments, each of the first polymeric shell and the second polymeric shell include an adhesive strip configured for attachment to one of the first electrode sub-assembly and the second electrode sub-assembly.

In some embodiments, adhesive is used to adhere an entirety of a contact area between the first polymeric shell and the first electrode sub-assembly.

In some embodiments, each of the first polymeric shell and the second polymeric shell include wing tabs useful to cover thin side surfaces of one of the first electrode sub-assembly and the second electrode sub-assembly.

In some embodiments, the system further includes a third electrode sub-assembly, a third polymeric shell, and a third metal foil sheet. The system further includes a fourth electrode sub-assembly, a fourth polymeric shell, and a fourth metal foil sheet. The third polymeric shell and the fourth polymeric shell collectively encapsulate the third electrode sub-assembly and the fourth electrode sub-assembly. The third metal foil sheet and the fourth metal foil sheet each extend between the third electrode sub-assembly and the fourth electrode sub-assembly and are configured for transferring heat away from the third electrode sub-assembly and the fourth electrode sub-assembly.

In some embodiments, the system further includes an enclosure including a metal can configured to receive the battery cell stack therewithin. The first metal foil sheet and the second metal foil sheet contact the metal can and are configured for exchanging heat with the metal can.

In some embodiments, the electrode sub-assembly includes a first electrode sub-assembly. The planar side of the first electrode sub-assembly includes a first planar side. The battery cell stack further includes a second electrode sub-assembly. The polymeric shell is disposed around the first electrode sub-assembly and the second electrode sub-assembly. The metal foil sheet is attached to the polymeric shell and is disposed next to and in contact with the first planar side of the first electrode sub-assembly and with a second planar side of the second electrode sub-assembly.

According to one alternative embodiment, a system for a high-performance prismatic lithium-ion battery cell is provided. The system includes a battery cell stack. The battery cell stack includes a first electrode sub-assembly including a plurality of pairs of anode electrodes and cathode electrodes and including a first planar side. The battery cell stack further includes a first polymeric shell disposed around the first electrode sub-assembly and configured for providing mechanical protection and electrical insulation to the first electrode sub-assembly. The battery cell stack further includes a first metal foil sheet attached to the first polymeric shell and disposed next to and in contact with the first planar side of the first electrode sub-assembly. The battery cell stack further includes a second electrode sub-assembly including a second planar side. The battery cell stack further includes a second polymeric shell disposed around the second electrode sub-assembly. The battery cell stack further includes a second metal foil sheet in contact with the second polymeric shell and disposed next to and in contact with the second planar side of the second electrode sub-assembly. The planar side of the first electrode sub-assembly is adjacent to the second planar side of the second electrode sub-assembly. A center portion of the battery cell stack is defined between the first electrode sub-assembly and the second electrode sub-assembly. The first metal foil sheet is in contact with the first planar side of the first electrode sub-assembly in the center portion. The second metal foil sheet is in contact with the second planar side of the second electrode sub-assembly in the center portion. The first polymeric shell and the second polymeric shell collectively encapsulate the first electrode sub-assembly and the second electrode sub-assembly. The first metal foil sheet and the second metal foil sheet are configured for collectively exchanging heat with the first electrode sub-assembly and the second electrode sub-assembly.

In some embodiments, the system further includes an enclosure including a metal can configured to receive the battery cell stack therewithin. The first metal foil sheet and the second metal foil sheet contact the metal can and are configured for exchanging heat with the metal can.

In some embodiments, the first metal foil sheet includes a first adhesive strip configured for attachment to the first electrode sub-assembly. The second metal foil sheet includes a second adhesive strip configured for attachment to the second electrode sub-assembly.

In some embodiments, the first polymeric shell includes a first adhesive strip configured for attachment to the first electrode sub-assembly. The second polymeric shell includes a second adhesive strip configured for attachment to the second electrode sub-assembly.

In some embodiments, adhesive is used to adhere an entirety of a contact area between the first polymeric shell and the first electrode sub-assembly.

In some embodiments, the system further includes an enclosure including a polymeric pouch configured to receive the battery cell stack therewithin.

According to one alternative embodiment, a method for a high-performance prismatic lithium-ion battery cell is defined. The method includes creating crease lines upon a polymeric shell in order to create a bottom portion of the polymeric shell, a retention tab on a first side of the bottom portion, and an outer vertical portion on a second side of the bottom portion. The method further includes disposing the polymeric shell on top of a metal foil sheet such that the polymeric shell and the metal foil sheet are in a horizontal orientation. The method further includes disposing an electrode sub-assembly including a first planar side and a second planar side upon the bottom portion, wherein the first planar side and the second planar side are in a vertical orientation. The method further includes folding the retention tab and an inner vertical portion of the metal foil sheet up along the first planar side of the electrode sub-assembly. The metal foil sheet extends past the retention tab and contacts the first planar side of the electrode assembly. The method further includes adhering the inner vertical portion to the first planar side. The method further includes folding the outer vertical portion of the polymeric shell and an outer vertical portion of the metal foil sheet up along the second planar side of the electrode sub-assembly. The method further includes adhering the outer vertical portion of the polymeric shell to the second planar side of the electrode sub-assembly. The metal foil sheet is configured for transferring heat away from the first planar side of the electrode sub-assembly.

In some embodiments, the polymeric shell includes a first polymeric shell, the metal foil sheet includes a first metal foil sheet, and the electrode sub-assembly includes a first electrode sub-assembly. The method further includes creating a second set of crease lines upon a second polymeric shell in order to create a second bottom portion of the second polymeric shell, a second retention tab of the second polymeric shell on a first side of the second bottom portion of the second polymeric shell, and a second outer vertical portion of the second polymeric shell on a second side of the second bottom portion of the second polymeric shell. The method further includes disposing the second polymeric shell on top of a second metal foil sheet. The method further includes disposing a second electrode sub-assembly including a third planar side and a fourth planar side upon the second bottom portion of the second polymeric shell. The method further includes folding the second retention tab of the second polymeric shell and a second inner vertical portion of the second metal foil sheet up along the third planar side of the second electrode sub-assembly. The second metal foil sheet extends past the second retention tab of the second polymeric shell and contacts the third planar side of the second electrode assembly. The method further includes adhering the second inner vertical portion of the second metal foil sheet to the third planar side. The method further includes folding the second outer vertical portion of the second polymeric shell and a second outer vertical portion of the second metal foil sheet up along the fourth planar side of the second electrode sub-assembly. The method further includes adhering the second outer vertical portion of the second polymeric shell to the fourth planar side of the second electrode sub-assembly. The method further includes disposing the second electrode sub-assembly so that the third planar side of the second electrode sub-assembly is adjacent to the first planar side of the first electrode sub-assembly. The first metal foil sheet and the second metal foil sheet are configured for transferring heat away from a central portion between the first electrode sub-assembly and the second electrode sub-assembly.

The above features and advantages and other features and advantages of the present disclosure are readily apparent from the following detailed description of the best modes for carrying out the disclosure when taken in connection with the accompanying drawings.

DETAILED DESCRIPTION

Figure 1:
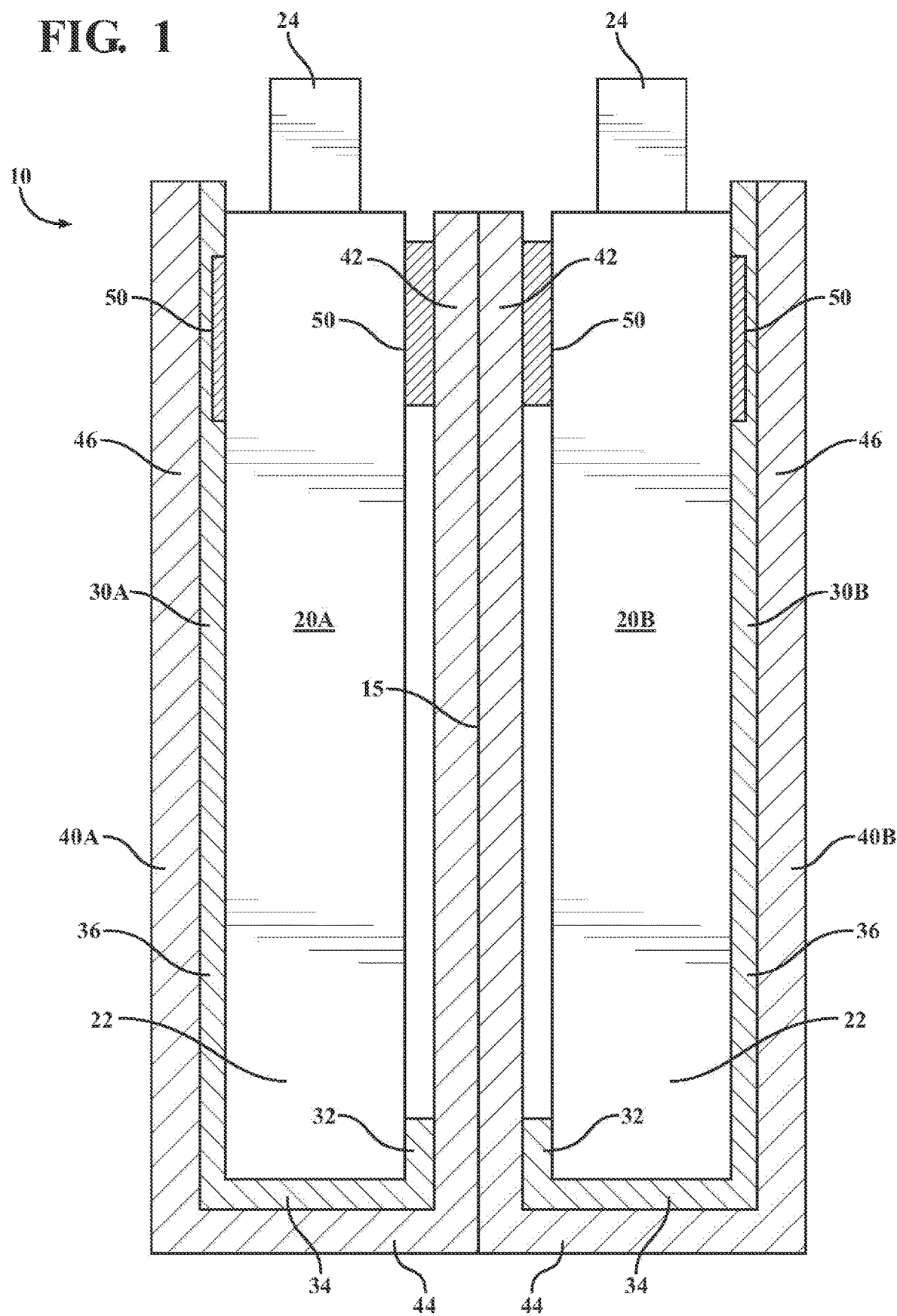
FIG. 1 schematically illustrates in side view an exemplary battery cell stack including polymeric shells and metal foil sheets extending into a center portion of the battery cell stack, in accordance with the present disclosure.

A battery cell generates heat whenever the battery cell undergoes either a charging cycle or a discharging cycle. This heat may be problematic and may limit operation of the battery cell to avoid the battery cell going over a maximum operating temperature.

Operation of a thick electrode jelly roll battery cell or stack-in prismatic battery cell may result in a relatively high temperature gradient inside of the cell. This high temperature gradient of prismatic battery cell may result in accelerated cycle life degradation and may limit the performance of the cell. Battery cell temperature may be a limiting factor in direct current fast charging (DCFC) station performance. Battery cell temperature may be a limiting factor in high performance or racing applications, where incremental battery output may mean a difference between winning and losing.

A battery cell stack may include a plurality of electrode assemblies. The battery cell stack may be placed within an enclosure useful to protect and isolate the battery cell. The enclosure may be a metal box with a container shape configured for holding the battery cell stack. The enclosure may be a polymerized pouch.

Each of the electrode assemblies of the battery cell stack may be mechanically protected and electrically insulated from contact with the enclosure. A polymeric shell may be utilized between the electrode assemblies and the enclosure for this protection and insulation.

Thermal insulative properties of the polymeric shell encasing the electrode assemblies of a battery cell within the enclosure may retain heat within the battery cell. An electrode assembly of a battery cell fully encased within a polymeric shell may retain more heat than a battery cell that is not fully encased.

A metal film includes increased thermal conductivity and reduced thermal insulative properties as compared to a polymeric film. A system and method for a high-performance lithium-ion battery cell stack is provided. A battery cell stack may include a plurality of electrode assemblies. Each electrode assembly may include a polymeric shell or a polymeric protective film configured for providing electrical insulation from the enclosure such as a metal can. The polymeric shell protects and electrically isolates an electrode assembly within the battery cell stack. The electrode assembly includes a plurality of anode and cathode pairs, each pair being useful to generate electrical energy. A metal film may be utilized to provide a heat conductive path from a center portion of the prismatic battery cell stack to an outer portion of the prismatic battery cell stack. The metal film includes a first portion disposed within an interior of the battery cell within the polymeric casing and receiving heat from the battery cell components therewithin. The metal film includes a second portion, projecting through the polymeric casing and providing a thermally conductive pathway to transmit heat outside of the polymeric casing through the metal film.

The disclosed system and method may include a heat dissipation pathway in the center of an electrode assembly. This battery cell stack includes the polymeric shell which provides an electrode assembly protection during the cell manufacturing and provides electrical isolation between the electrode assembly and neighboring metallic structures such as a metallic can configured for holding the battery cell stack. The battery cell stack further includes the metal film including the portion of the metal film within the battery cell stack configured for minimizing heat accumulation in the center of electrode assembly during fast charge modes and high-performance discharge modes.

The plurality of battery cells may be utilized together as the battery cell stack, providing a battery cell stack positive terminal and a battery cell stack negative terminal for use with an electrical system.

The disclosed system includes an electrode assembly and a metal film or a metallic sheet, wherein the metal film is partially covered with an insulative polymeric layer. The metal film includes a portion that extends through or between portions of the polymeric layer, such that the portion is disposed outside of the polymeric layer. In one embodiment, the portion of the metal film disposed outside of the polymeric layer lays flat against and follows an outside contour of the polymeric layer. The portion of the metal firm disposed outside of the polymeric layer may include an adhesive layer or an adhesive patch to affix the portion of the metal firm to the cell electrode assembly.

The battery cell stack includes the electrode assembly. The metal foil may be disposed in a center portion of the electrode assembly. In one embodiment, the metal foil may be a planar sheet that bisects the electrode assembly into two or more electrode sub-assemblies. Each of the sub-electrode assembly includes a plurality of pairs of an anode electrode and a cathode electrode. The planar sheet of the metal foil may be disposed adjacent to and in contact with a planar side of each of two electrode sub-assemblies, such that the planar sheet of the metal foil is in contact with most or all of one planar side of each of the electrode sub-assemblies. By having a relatively large or maximized contact area between the metal foil and the electrode sub-assemblies, heat transfer from the electrode sub-assemblies to the metal foil may be maximized.

More than two electrode sub-assemblies may be utilized in a battery cell stack. For example, two electrode sub-assemblies may each cover one half of one side of a planar sheet of metal foil, with the one planar sheet receiving heat from a plurality of the electrode sub-assemblies on a single side of the planar sheet. In another example, the electrode sub-assemblies may be stacked and separated by repeating planar sheets of metal foil, for example, with four stacked electrode sub-assemblies being separated by three planar sheets of metal foil.

In an alternative to the metal foil being provided as planar sheets, electrode sub-assemblies may each be wrapped or encapsulated within metal foil. The metallic film may then be disposed in a center portion of the battery cell stack when the electrode sub-assemblies are assembled into a final electrode assembly.

During an exemplary assembly process, an electrode sub-assembly will be placed on a pre-folded bottom location of the insulative polymeric layer. During the process, the electrode sub-assembly remains in an upright orientation, with planar side walls of the electrode sub-assembly being in a vertical orientation and with terminals of the electrode sub-assembly being on top of the electrode sub-assembly. The insulative polymeric layer and the metal foil may be folded upward into a vertical orientation to contact or be disposed against planar side faces of the electrode sub-assembly. If the insulative polymeric layer has wing tabs useful to cover thin side surfaces of the electrode sub-assembly, these wing tabs may be folded around the thin side surfaces. One may add adhesive tape to fix in place the polymeric layer and the metal foil relative to the electrode sub-assembly. The tape may cover the side of electrode sub-assembly to ensure sufficient electrical isolation and protection from damage during battery cell stack integration process into the metallic prismatic can. One may utilize an extra polymeric insulative layer to cover the side of the electrode sub-assembly.

The disclosed system and method are described as receiving heat from battery cell components and transmitting the heat outside of the prismatic battery cell polymeric shell to expel the heat or dissipate the heat to surrounding areas. The same battery cell configuration may be utilized to efficiently heat the battery cell components, for example, during a cold start condition, transferring heat into the battery from an outside source. The metal foil sheet may be described as being configured for exchanging heat with the electrode assembly, which may include transferring heat away from the electrode assembly and/or transferring heat into the electrode assembly.

Referring now to the drawings, wherein like reference numbers refer to like features throughout the several views, FIG. 1 schematically illustrates in side view an exemplary battery cell stack 10 including polymeric shells 30A, 30B and metal foil sheets 40A, 40B extending into a center portion 15 of the battery cell stack 10. An electrode sub-assembly 20A and an electrode sub-assembly 20B are illustrated. The electrode sub-assembly 20A is situated within a U-shaped structure formed by the polymeric shell 30A. The polymeric shell 30A may be described as a polymeric layer and includes an outer vertical portion 36, a bottom portion 34, and a retention tab 32. The metal foil sheet 40A is wrapped around the polymeric shell 30A. The metal foil sheet 40A includes an outer vertical portion 46, a bottom portion 44, and an inner vertical portion 42 which extends upwardly past the retention tab 32 and contacts a planar face of the electrode sub-assembly 20A. The electrode sub-assembly 20A includes a plurality of anode and cathode pairs and generates heat as it operates in either a charging cycle or a discharging cycle. The polymeric shell 30A acts as an electrical and thermal insulator and limits how much heat may dissipate from the electrode sub-assembly 20A through the polymeric shell 30A. The metal foil sheet 40A is an excellent heat conductor, and heat transferred to inner vertical portion 42 of the the metal foil sheet 40A from the electrode sub-assembly 20A passes through the bottom portion 44 of the metal foil sheet 40A to the vertical outer portion 46, where the heat may dissipate or be transmitted away from the vertical outer portion through contact with other structures.

The electrode sub-assembly 20B is situated within a U-shaped structure formed by the polymeric shell 30B. The polymeric shell 30B includes an outer vertical portion 36, a bottom portion 34, and a retention tab 32. The metal foil sheet 40B is wrapped around the polymeric shell 30B. The metal foil sheet 40B includes an outer vertical portion 46, a bottom portion 44, and an inner vertical portion 42 which extends upwardly past the retention tab 32 and contacts a planar face of the electrode sub-assembly 20B. The electrode sub-assembly 20B includes a plurality of anode and cathode pairs and generates heat as it operates in either a charging cycle or a discharging cycle. The polymeric shell 30B acts as an electrical and thermal insulator and limits how much heat may dissipate from the electrode sub-assembly 20B through the polymeric shell 30B. The metal foil sheet 40B is an excellent heat conductor, and heat transferred to inner vertical portion 42 of the metal foil sheet 40B from the electrode sub-assembly 20B passes through the bottom portion 44 of the metal foil sheet 40B to the vertical outer portion 46, where the heat may dissipate or be transmitted away from the vertical outer portion through contact with other structures.

The polymeric shell 30A and the polymeric shell 30B collectively act to mechanically protect the electrode sub-assemblies 20A, 20B disposed therewithin. The metal foil sheets 40A, 40B extend into the center portion 15 of the battery cell stack 10 and transmit heat away from the center portion 15 such that the heat may be dissipated along the outer vertical portions 46 and/or through connecting structures.

Adhesive sections 50 are shown optionally used to connect portions of the battery cell stack 10 together and keep components of the battery cell stack 10 in proper alignment.

The electrode sub-assemblies 20A, 20B are each illustrated including an electrode sub-assembly body 22 including the plurality of anode and cathode pairs and electrical terminals 24 which may connect to current collectors within the electrode sub-assemblies 20A, 20B.

The electrode sub-assemblies 20A, 20B, the polymeric shells 30A, 30B, the metal foil sheets 40A, 40B, and the adhesives 50 are illustrated with exemplary thicknesses for the viewer to understand the structure of the battery cell stack 10. Actual thicknesses and dimensions of the various components will vary. Metal foil sheets 40A, 40B may be cross-sectionally very thin as compared to the electrode sub-assemblies 20A, 20B and the polymeric shells 30A, 30B. The inner vertical portions 42 of the metal foil sheets 40A, 40B are illustrated as straight walls in FIG. 1 for clarity regarding the metal foil sheets 40A, 40B having a substantially constant cross-sectional thickness. It will be appreciated that metal foil is not rigid, will deform and bend, and will contact the planar sides of the electrode sub-assembly 20A, 20B.

The inner vertical portions 42 of the metal foil sheets 40A, 40B are configured to collectively and cooperatively exchange heat with both the electrode sub-assemblies 20A and 20B. Contact between the inner vertical portions 42 enables heat to be transferred through either or both of the metal foil sheets 40A, 40B, thereby providing excellent heat management.

Adhesives 50 are provided in exemplary positions with exemplary sizes. In one embodiment, adhesive 50 may cover an entirety of contact surface area between the polymeric shells 30A, 30B and the electrode sub-assemblies 20A, 20B. In another embodiment, adhesives 50 may cover an entirety of contact surface area between the metal foil sheets 40A, 40B and either or both of the electrode sub-assemblies 20A, 20B and the polymeric shells 30A, 30B.

Figure 2:
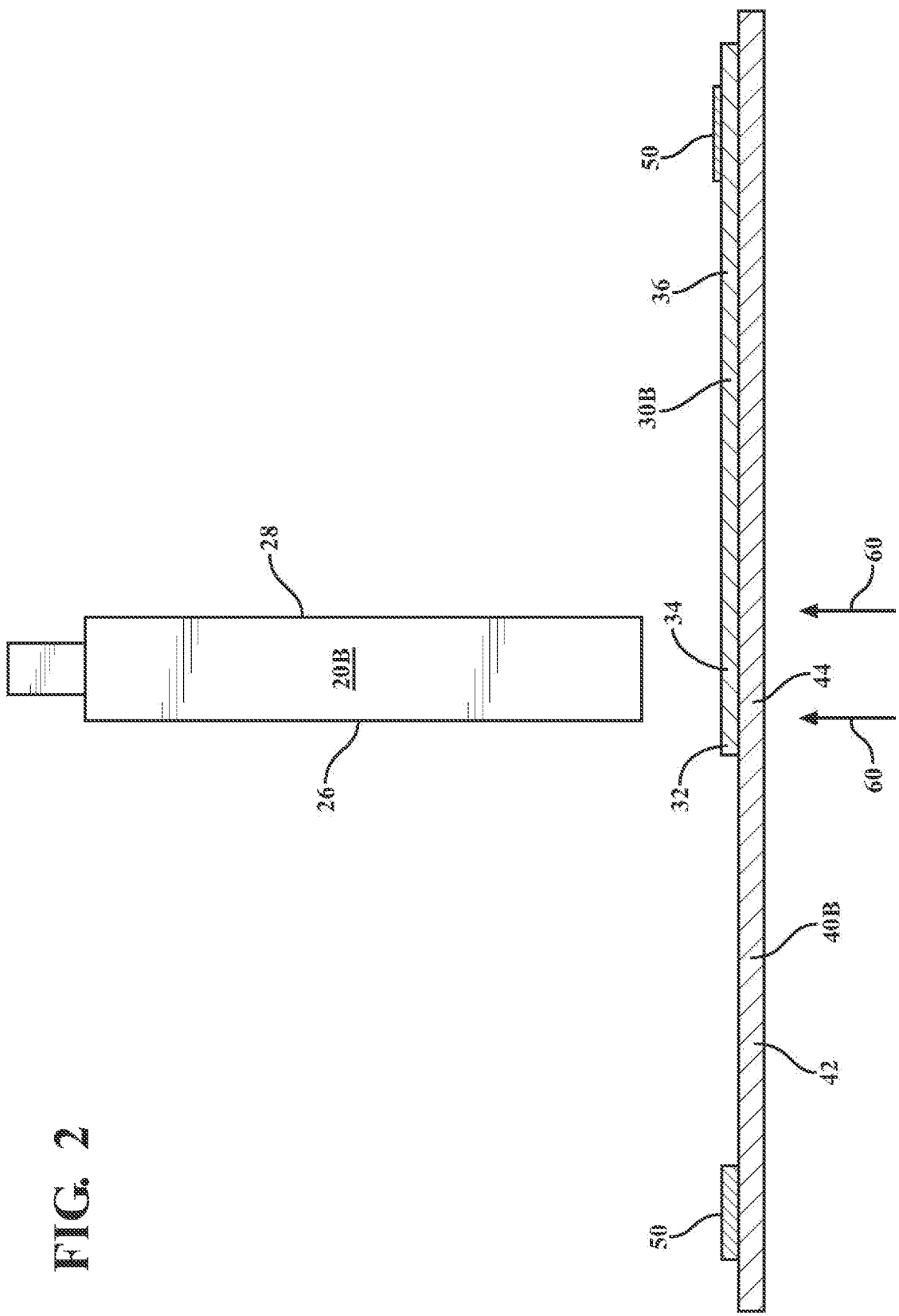
FIG. 2 schematically illustrates electrode sub-assembly of FIG. 1 in an assembly state, with the electrode sub-assembly being aligned to the polymeric shell and the metal foil sheet in preparation for being installed thereto, in accordance with the present disclosure.

FIG. 2 schematically illustrates electrode sub-assembly 20B of FIG. 1 in an assembly state, with the electrode sub-assembly 20B being aligned to the polymeric shell 30B and the metal foil sheet 40B in preparation for being installed thereto. The polymeric shell 30B is illustrated disposed on top of the metal foil sheet 40B, with both components being in an exemplary horizontal orientation. The electrode sub-assembly 20B is illustrated including planar side faces 26 and 28 in an exemplary vertical orientation. The electrode sub-assembly 20B is illustrated in a position over the bottom portion 34 and the bottom portion 44, such that when the electrode sub-assembly 20B is lowered, it will be disposed sitting upon the bottom portion 34. Arrows 60 illustrate locations where creases may be formed either in advance or as part of the manufacturing process, in particular, with creases in the polymeric shell 30B being useful to easily place the electrode sub-assembly 20B into a correct location relative to the polymeric shell 30B. Once the electrode sub-assembly 20B is placed upon the bottom portion 34, the retention tab 32 and the inner vertical portion 42 may be folded up against the planar side face 26, and the adhesive 50 may be utilized to fix the inner vertical portion 42 against the electrode sub-assembly 20B. Similarly, the outer vertical portion 36 and the outer vertical portion 46 may be folded up against the planar side face 28, and the adhesive 50 may be utilized to fix the outer vertical portion 36 against the electrode sub-assembly 20B. The outer vertical portion 46 may be adhered to, taped to, or otherwise affixed to the outer vertical portion 36.

Figure 3:
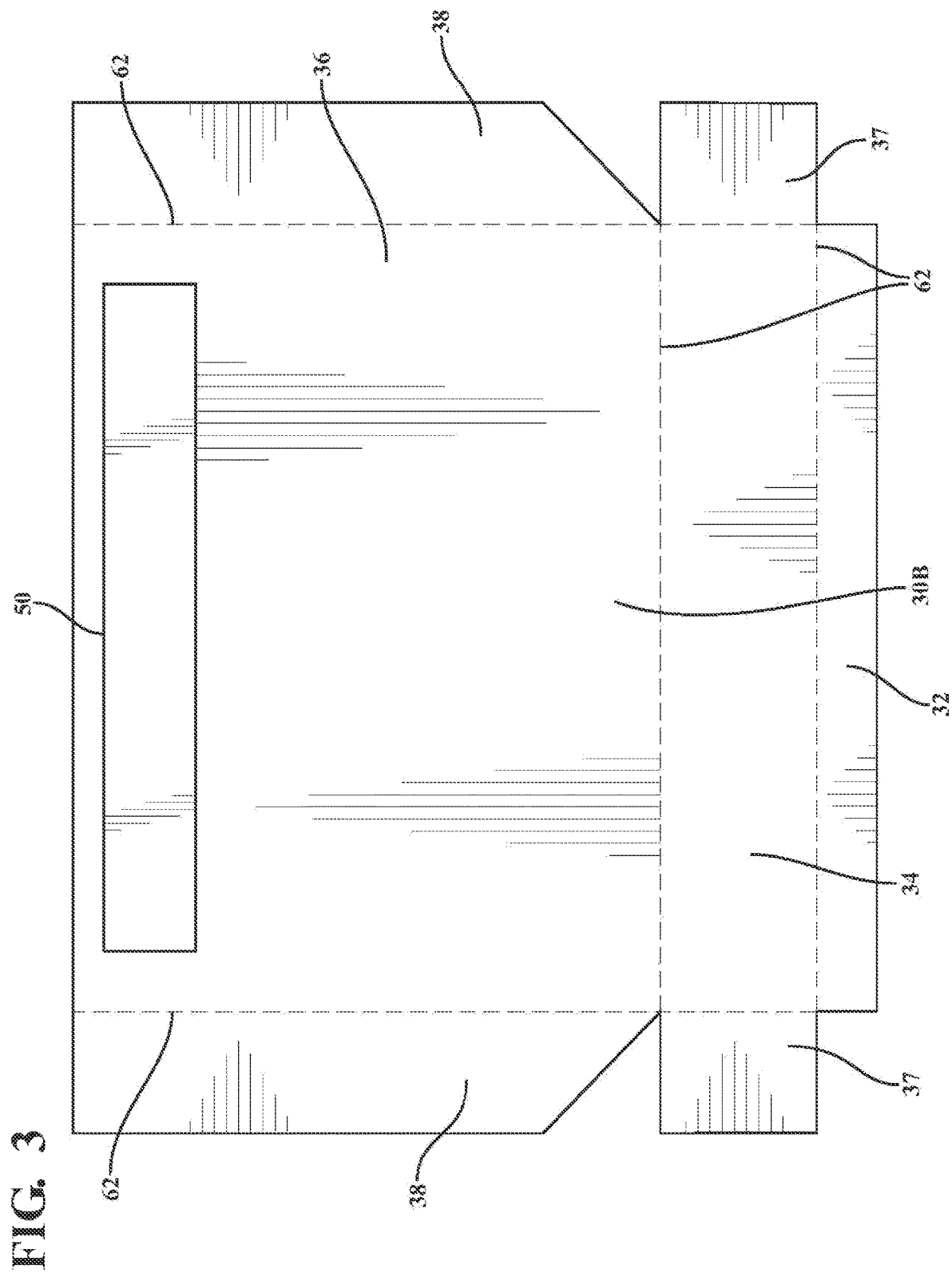
FIG. 3 schematically illustrates in top view the polymeric shell prior to installation to the electrode sub-assembly of FIG. 2, in accordance with the present disclosure.

FIG. 3 schematically illustrates in top view the polymeric shell 30B prior to installation to the electrode sub-assembly 20B of FIG. 2. The polymeric shell 30B is illustrated including the retention tab 32, the bottom portion 34, and the outer vertical portion 36. The adhesive 50 is illustrated upon the outer vertical portion 36. The adhesive 50 may initially be covered with a shipping tape, which may be removed prior to the adhesive 50 being utilized to adhere the polymeric shell 30B to the electrode sub-assembly 20B. The polymeric shell 30B is illustrated including optional side wings 37 and side wings 38. The side wings 37, 38 may wrap around a thin side surface of the electrode sub-assembly 20B to provide mechanical protection and electrical insulation to the electrode sub-assembly 20B. Crease lines 62 are illustrated with dotted lines, showing where the polymeric shell 30B may be creased to facilitate assembly of the battery cell stack 10.

Figure 4:
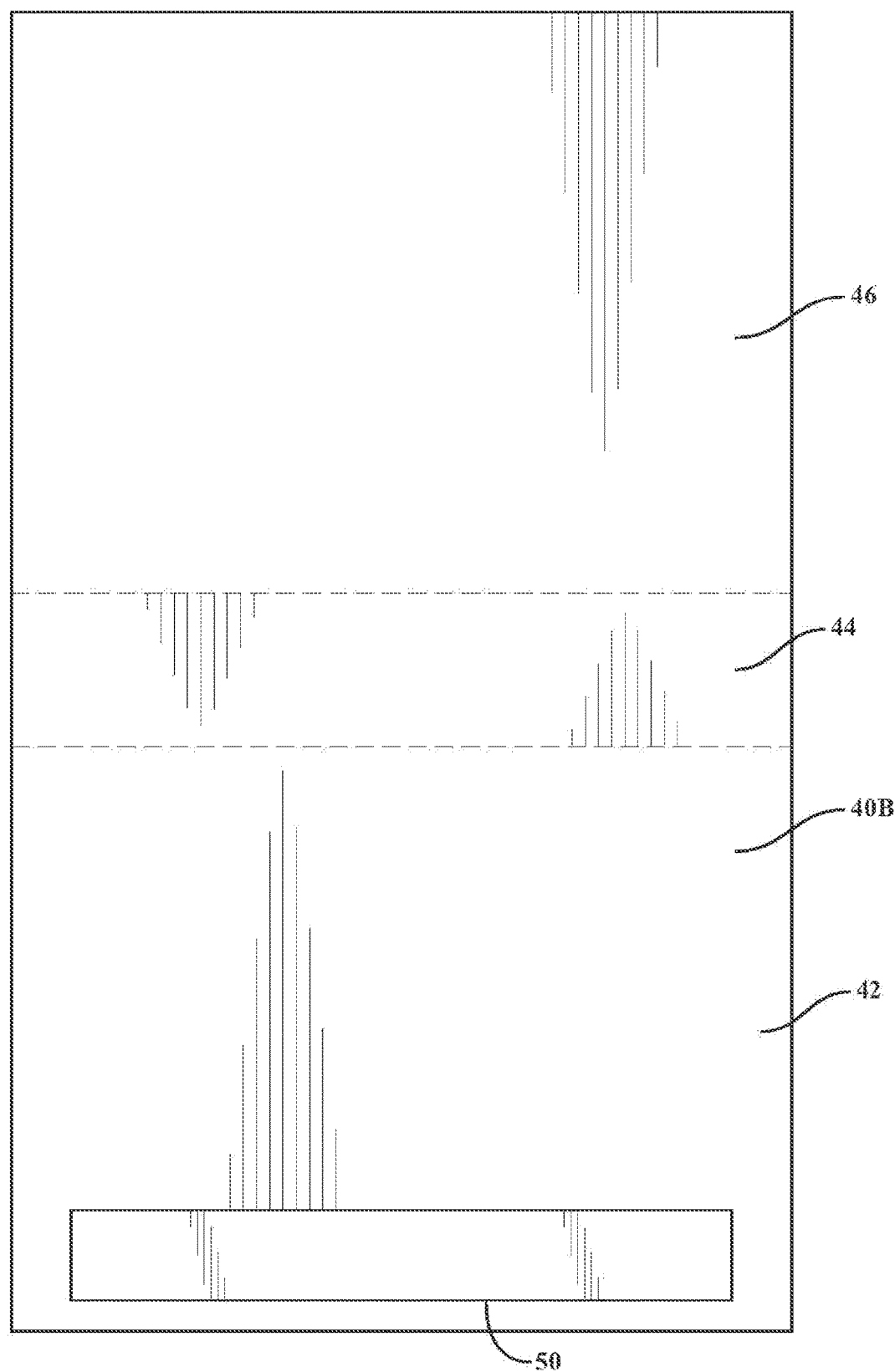
FIG. 4 schematically illustrates in top view the metal foil sheet prior to installation to the electrode sub-assembly of FIG. 2, in accordance with the present disclosure.

FIG. 4 schematically illustrates in top view the metal foil sheet 40B prior to installation to the electrode sub-assembly 20B of FIG. 2. The metal foil sheet 40B is illustrated including the inner vertical portion 42, the bottom portion 44, and the outer vertical portion 46. The adhesive 50 is illustrated upon the inner vertical portion 42. The adhesive 50 may initially be covered with a shipping tape, which may be removed prior to the adhesive 50 being utilized to adhere the metal foil sheet 40B to the electrode sub-assembly 20B. The adhesives 50 of FIGS. 3 and 4 are of exemplary shapes and are disposed at exemplary locations. Size, geometry, type, and location of the adhesives 50 may vary.

Figure 5:
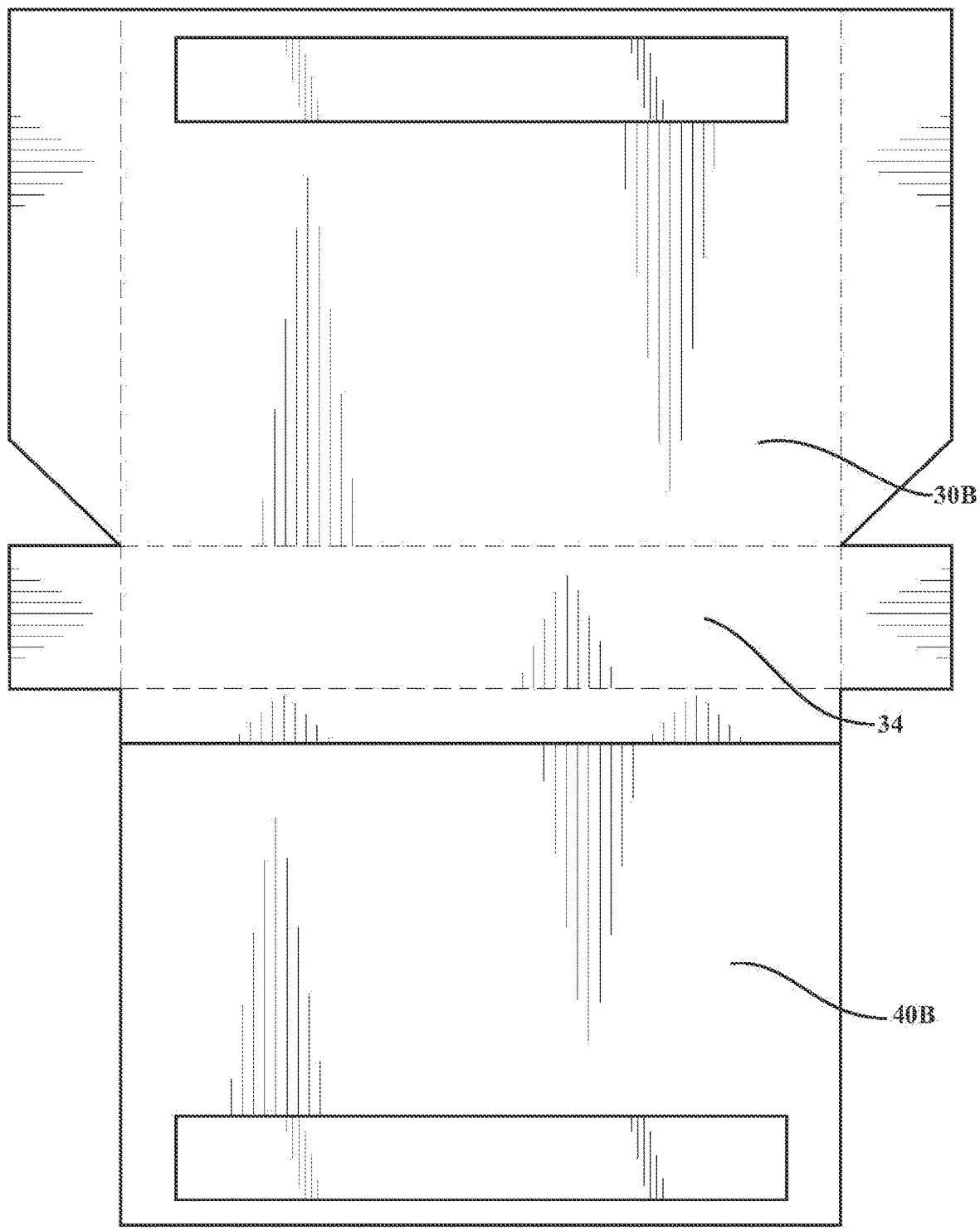
FIG. 5 schematically illustrates in top view the polymeric shell of FIG. 3 laid on top of the metal foil sheet of FIG. 4, in accordance with the present disclosure.

FIG. 5 schematically illustrates in top view the polymeric shell 30B of FIG. 3 laid on top of the metal foil sheet 40B of FIG. 4. The bottom portion 34 is illustrated on the polymeric shell 30B, visible as a result of the crease lines 62 of FIG. 3. The polymeric shell 30B and the metal foil sheet 40B of FIG. 5 are illustrated ready to receive and be installed to the electrode sub-assembly 20B of FIG. 2.

Figure 6:
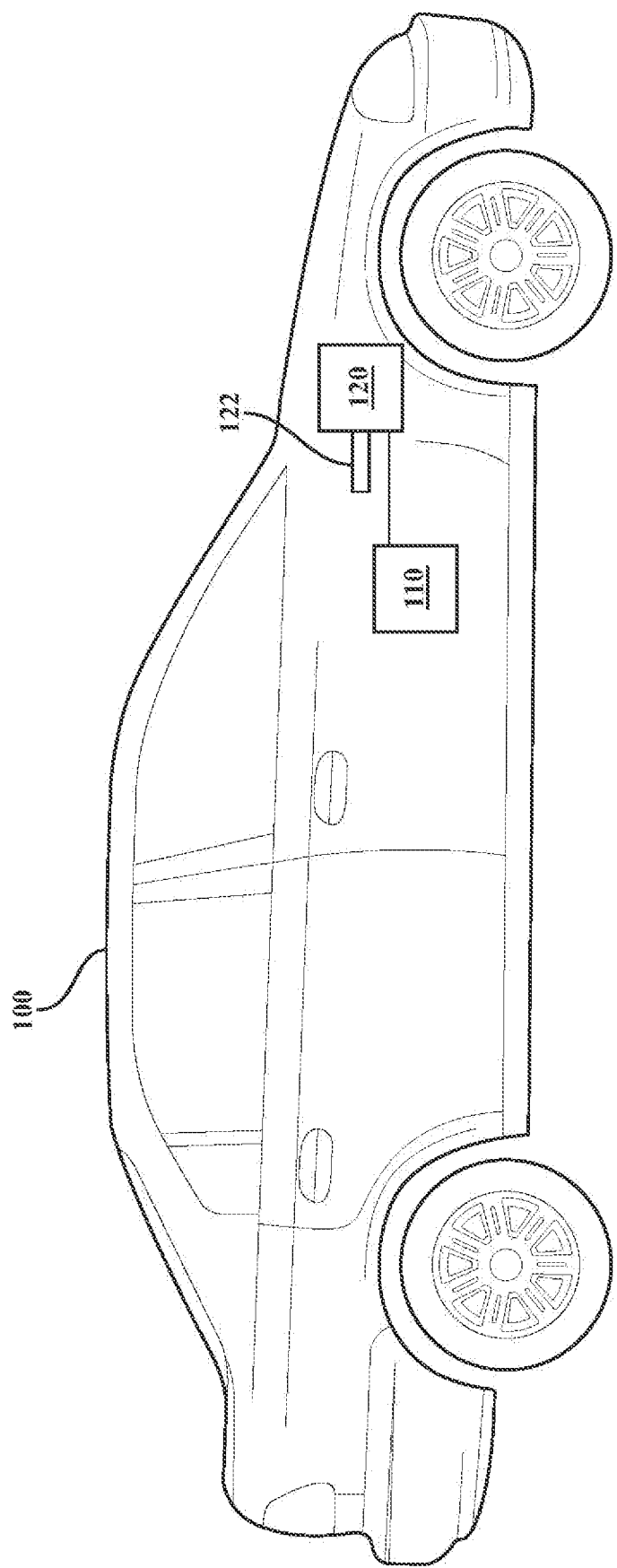
FIG. 6 schematically illustrates a device including a vehicle including an energy storage device and an electric machine, in accordance with the present disclosure.

FIG. 6 schematically illustrates a device 100 including a vehicle including an energy storage device 110 and an electric machine 120. The energy storage device 110 includes one or more battery cell stacks 10 of FIG. 1. As a result of the metal foil sheets 40A, 40B extending into the center portion 15 of the battery cell stack 10 of FIG. 1, the energy storage device 110 is able to provide excellent heat management of the one or more battery cell stacks 10. The energy storage device 110 may include fixed cooling fins, a cooling fan, a coolant loop, or other similar sub-system useful to receive heat from the metal foil sheets 40A, 40B of the battery cell pack and transfer that heat away from the energy storage device 110. The electric machine 120 includes an output shaft component 122 configured for providing mechanical energy to the device 100, for example, to provide motive force to the device 100.

Figure 7:
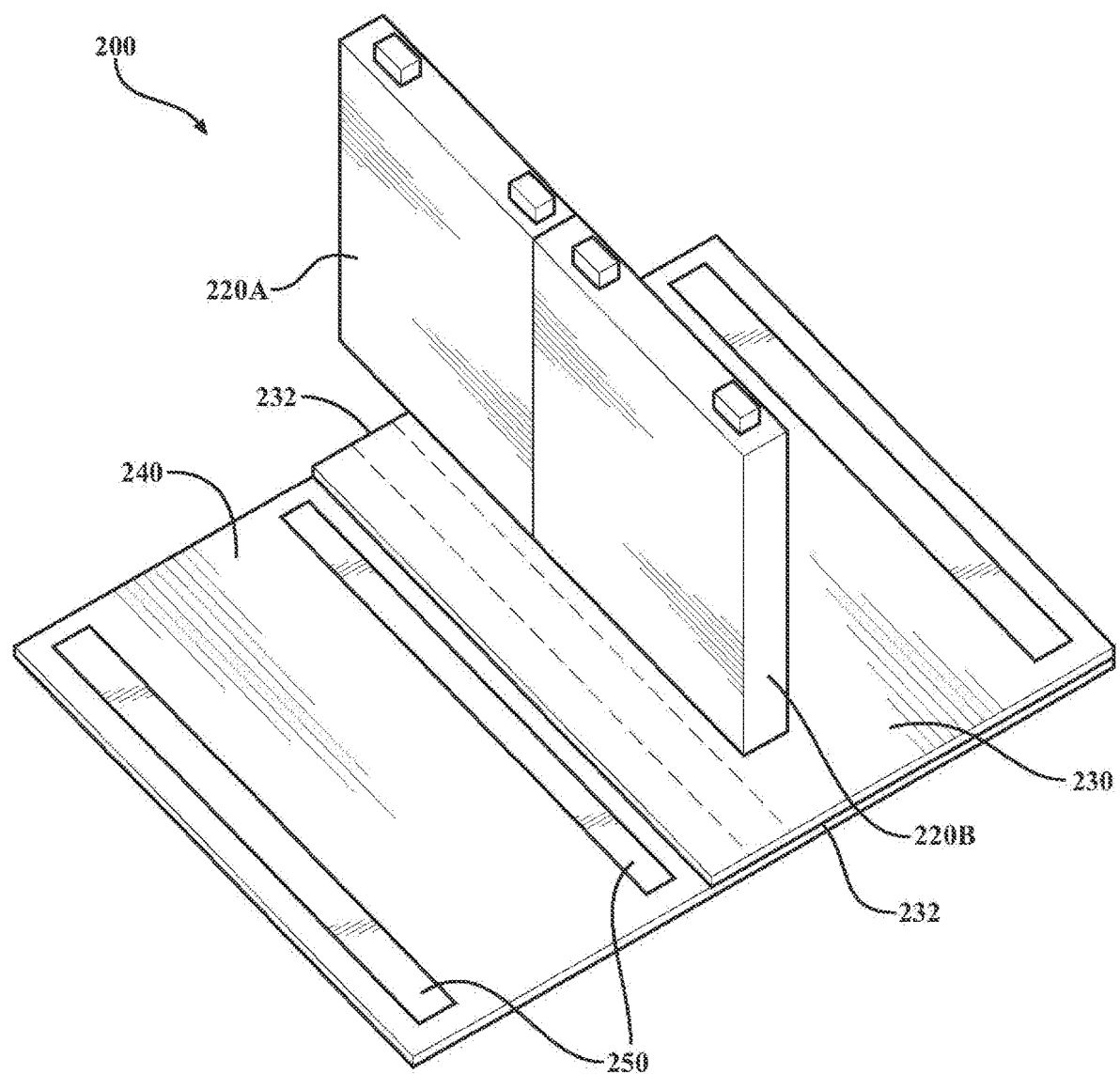
FIG. 7 schematically illustrates an alternative embodiment of the battery cell stack of FIG. 1, in accordance with the present disclosure.

FIG. 7 schematically illustrates an alternative embodiment of the battery cell stack 10 of FIG. 1. A battery cell stack 200 is illustrated including two side-by side electrode sub-assemblies 220A, 220B. A polymeric shell 230 and a metal foil sheet 240 are illustrated ready to be installed to the side-by-side electrode sub-assemblies 220A, 220B. The side-by-side electrode sub-assemblies 220A, 220B may be attached to each other with a bracket, tape, fasteners, clips, or may simply be placed side-by-side. The polymeric shell 230 may have side wings similar to the polymeric shell 30B of FIG. 3. In the embodiment of FIG. 7, the polymeric shell 230 has straight sides 232 that are flush with sides of the metal foil sheet 240. Adhesives 250 are illustrated disposed to affix the polymeric shell 230 and the metal foil sheet 240 to the side-by-side electrode sub-assemblies 220A, 220B. A mirror image of the electrode sub-assemblies 220A, 220B, the polymeric shell 230, and the metal foil sheet 240 may be similarly assembled, with inner vertical portions of the metal foil sheets 240 facing each other as is illustrated in relation to battery cell stack 10 of FIG. 1.

Figure 8:
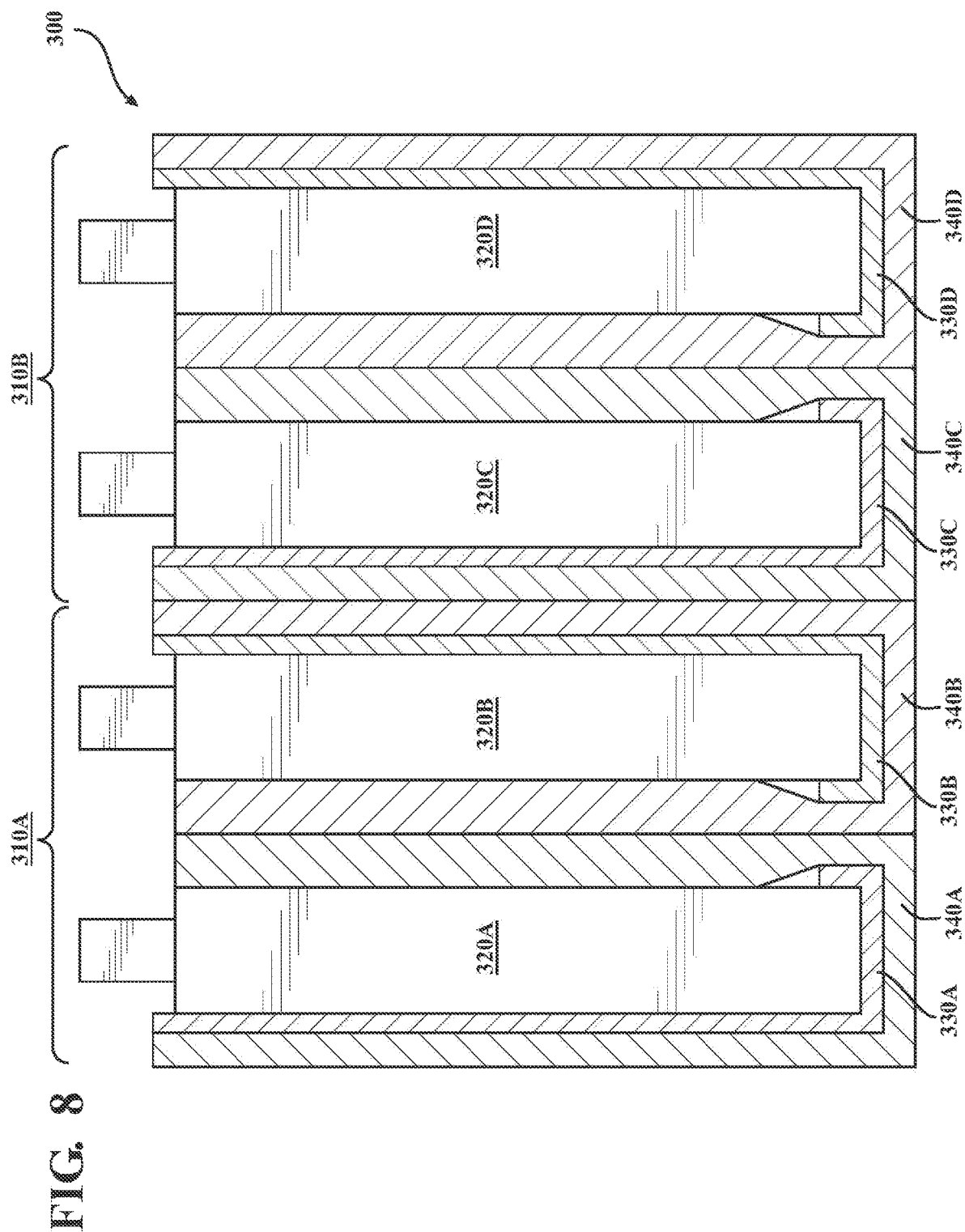
FIG. 8 schematically illustrates an alternative embodiment of the battery cell stack of FIG. 1, in accordance with the present disclosure.

FIG. 8 schematically illustrates an alternative embodiment of the battery cell stack 10 of FIG. 1. A battery cell stack 300 is illustrated, including a first electrode sub-assembly pair 310A and a second electrode sub-assembly pair 310B. The first electrode sub-assembly pair 310A includes an electrode sub-assembly 320A and an electrode sub-assembly 320B. The second electrode sub-assembly pair 310B include an electrode sub-assembly 320C and an electrode sub-assembly 320D. A polymeric shell 330A and a metal foil sheet 340A are illustrated installed to the electrode sub-assembly 320A. A polymeric shell 330B and a metal foil sheet 340B are illustrated installed to the electrode sub-assembly 320B. A polymeric shell 330C and a metal foil sheet 340C are illustrated installed to the electrode sub-assembly 320C. A polymeric shell 330D and a metal foil sheet 340D are illustrated installed to the electrode sub-assembly 320D. The metal foil sheets 340A, 340B, 340C, and 340D are disposed in contact with each other in series. Heat generated in each of the electrode sub-assemblies 320A, 320B, 320C, 320D may be transmitted through the metal foil sheets 340A, 340B, 340C, 340D, respectively. The heat may additionally transfer from a first one of the metal foil sheets 340A, 340B, 340C, 340D to a second neighboring one of the metal foil sheets 340A, 340B, 340C, 340D. In this way, heat generated within the electrode sub-assemblies 320A, 320B, 320C, 320D may be transferred away from the electrode sub-assemblies 320A, 320B, 320C, 320D. FIG. 8 illustrates the metal foil sheets 340A, 340B, 340C, 340D contacting the planar sides of the respective electrode sub-assemblies 320A, 320B, 320C, 320D. The metal foil sheets 340A, 340B, 340C, 340D have substantially constant thickness. The illustrated widening of the metal foil sheets 340A, 340B, 340C, 340D in the areas where they contact the electrode sub-assemblies 320A, 320B, 320C, 320D illustrates waviness, deformation, and bending of the metal foil sheets 340A, 340B, 340C, 340D as they contact the respective electrode sub-assemblies 320A, 320B, 320C, 320D.

Figure 9:
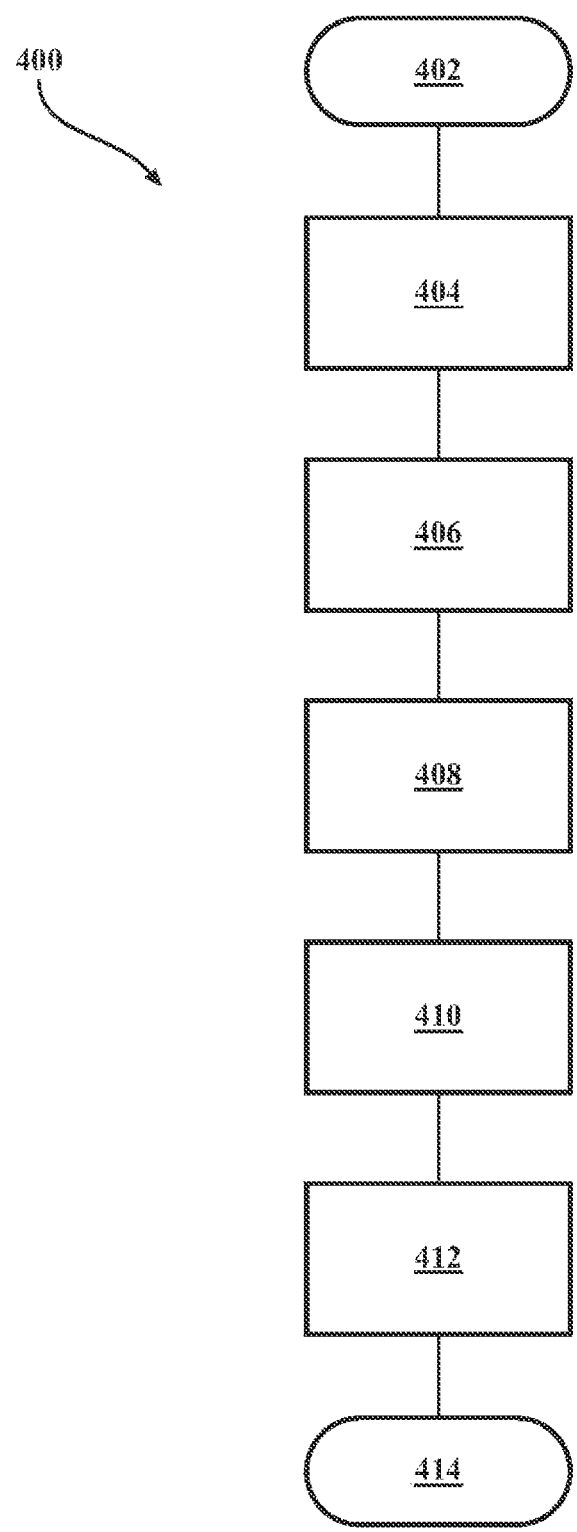
FIG. 9 is a flowchart illustrating an exemplary method for a high-performance prismatic lithium-ion battery cell, in accordance with the present disclosure.

FIG. 9 is a flowchart illustrating an exemplary method 400 for a high-performance prismatic lithium-ion battery cell. The method 400 discusses steps that may be performed in relation to the battery cell stack 10 of FIG. 1, although a variety of alternative physical components may be utilized. The method 400 starts at a step 402. At a step 404, a polymeric shell 30B is disposed on top of a metal foil sheet 40B in preparation for installing the polymeric shell 30B and the metal foil sheet 40B to an electrode sub-assembly 20B. At a step 406, the polymeric shell 30B and the metal foil sheet 40B are installed to the sub-assembly 20B, with adhesive 50 being utilized to hold the components together. At step a step 408, the sub-assembly 20B with the polymeric shell 30B and the metal foil sheet 40B are paired with a second sub-assembly 20A, with the polymeric shell 30A and the metal foil sheet 40A installed thereto, as is illustrated in FIG. 1. The paired sub-assemblies 20A, 20B together may be described as the battery cell stack 10 of FIG. 1. At a step 410, the battery cell stack 10 is installed to an energy storage device 110 of FIG. 6, which is in turn installed to a device 100. At a step 412, the energy storage device 110 of FIG. 6 is utilized through a plurality of charging and discharging cycles to repeatedly store electrical energy and then discharge the electrical energy for use by the device 100, with heat generated by the battery cell stack 10 being transferred out of the energy storage device 110 with excellent efficiency. The method 400 ends at a step 414. The method 400 is provided as an exemplary method to utilize the battery cell stack 10 of FIG. 1. A number of additional and/or alternative method steps are envisioned, and the disclosure is not intended to be limited to the examples provided herein.

Figure 10:
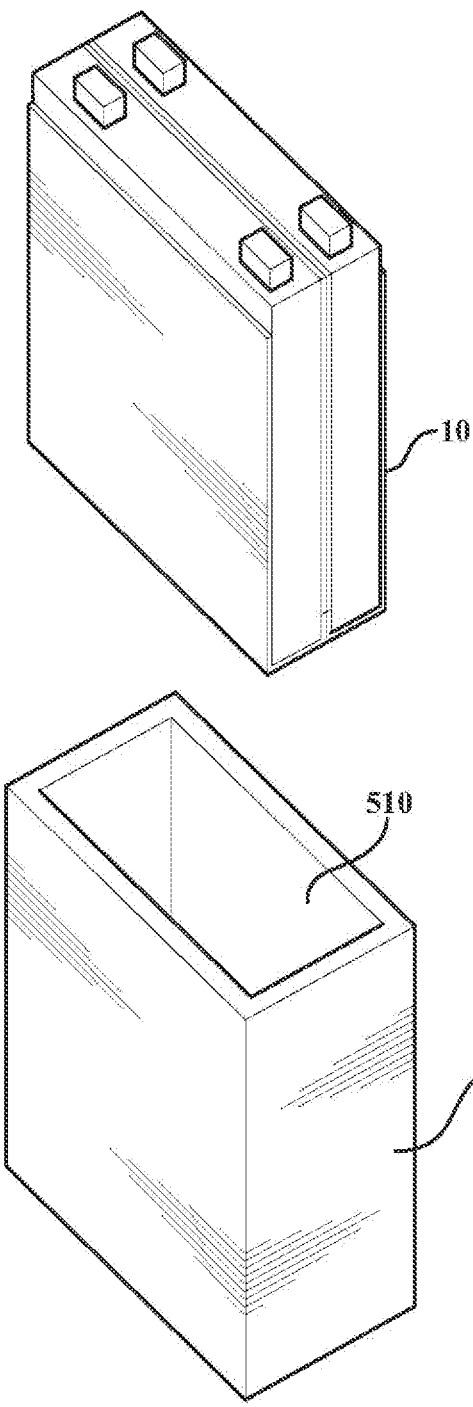
FIG. 10 schematically illustrates the battery cell stack of FIG. 1 and an enclosure configured for encasing the battery cell stack in accordance with the present disclosure.

FIG. 10 schematically illustrates the battery cell stack 10 of FIG. 1 and an enclosure 500 configured for encasing the battery cell stack 10. The enclosure 500 may be constructed with metal, a polymer, or a polymer film. The enclosure 500 is provided for purpose of illustration, while the shape, thickness, dimensions, etc. of the enclosure 500 may vary depending upon the material used to construct the enclosure 500. The enclosure 500 includes an interior surface 510 which contacts the battery cell stack 10 when the battery cell stack 10 is installed to the enclosure 500. In one embodiment, where the enclosure is constructed with metal, the metal foil sheet 40A, 40B of FIG. 1 will contact the interior surface 510, and the heat from the metal foil sheet 40 may transmit directly to the enclosure 500 and be dispersed from an outer surface it the enclosure 500.

While the best modes for carrying out the disclosure have been described in detail, those familiar with the art to which this disclosure relates will recognize various alternative designs and embodiments for practicing the disclosure within the scope of the appended claims.

What is claimed is:

1. A system for a high-performance prismatic lithium-ion battery cell, the system comprising:
    a battery cell stack including:
        an electrode sub-assembly including a plurality of pairs of anode electrodes and cathode electrodes and including a planar side;
        a polymeric shell disposed around the electrode sub-assembly and configured for providing mechanical protection and electrical insulation to the electrode sub-assembly; and
        a metal foil sheet attached to the polymeric shell and disposed next to and in contact with the planar side of the electrode sub-assembly, wherein the metal foil sheet is configured for exchanging heat with the electrode sub-assembly.

2. The system of claim 1, wherein the electrode sub-assembly includes a first electrode sub-assembly;
    wherein the planar side of the first electrode sub-assembly includes a first planar side;
    wherein the polymeric shell includes a first polymeric shell;
    wherein the metal foil sheet includes a first metal foil sheet; and
    wherein the battery cell stack further includes:
        a second electrode sub-assembly including a second planar side;
        a second polymeric shell disposed around the second electrode sub-assembly; and
        a second metal foil sheet in contact with the second polymeric shell and disposed next to and in contact with the second planar side of the second electrode sub-assembly.

3. The system of claim 2, wherein the planar side of the first electrode sub-assembly is adjacent to the second planar side of the second electrode sub-assembly;
    wherein a center portion of the battery cell stack is defined between the first electrode sub-assembly and the second electrode sub-assembly;
    wherein the first metal foil sheet is in contact with the first planar side of the first electrode sub-assembly in the center portion; and
    wherein the second metal foil sheet is in contact with the second planar side of the second electrode sub-assembly in the center portion.

4. The system of claim 3, wherein the first polymeric shell and the second polymeric shell collectively encapsulate the first electrode sub-assembly and the second electrode sub-assembly.

5. The system of claim 3, wherein the first metal foil sheet and the second metal foil sheet each are attached to an outer surface of a respective one of the first polymeric shell and the second polymeric shell; and
    wherein the first metal foil sheet and the second metal foil sheet each include a portion extending between the first polymeric shell and the second polymeric shell into the center portion.

6. The system of claim 5, wherein the portions extending between the first polymeric shell and the second polymeric shell each include an adhesive strip configured for attachment to one of the first electrode sub-assembly and the second electrode sub-assembly.

7. The system of claim 3, wherein each of the first polymeric shell and the second polymeric shell include an adhesive strip configured for attachment to one of the first electrode sub-assembly and the second electrode sub-assembly.

8. The system of claim 3, wherein adhesive is used to adhere an entirety of a contact area between the first polymeric shell and the first electrode sub-assembly.

9. The system of claim 3, wherein each of the first polymeric shell and the second polymeric shell include wing tabs useful to cover thin side surfaces of one of the first electrode sub-assembly and the second electrode sub-assembly.

10. The system of claim 3, further comprising:
    a third electrode sub-assembly;
    a third polymeric shell;
    a third metal foil sheet;
    a fourth electrode sub-assembly;
    a fourth polymeric shell; and
    a fourth metal foil sheet;
    wherein the third polymeric shell and the fourth polymeric shell collectively encapsulate the third electrode sub-assembly and the fourth electrode sub-assembly; and
    wherein the third metal foil sheet and the fourth metal foil sheet each extend between the third electrode sub-assembly and the fourth electrode sub-assembly and are configured for transferring heat away from the third electrode sub-assembly and the fourth electrode sub-assembly.

11. The system of claim 3, further comprising an enclosure including a metal can configured to receive the battery cell stack therewithin; and
    wherein the first metal foil sheet and the second metal foil sheet contact the metal can and are configured for exchanging heat with the metal can.

12. The system of claim 1, wherein the electrode sub-assembly includes a first electrode sub-assembly;
wherein the planar side of the first electrode sub-assembly includes a first planar side;
wherein the battery cell stack further includes a second electrode sub-assembly;
wherein the polymeric shell is disposed around the first electrode sub-assembly and the second electrode sub-assembly; and
wherein the metal foil sheet is attached to the polymeric shell and is disposed next to and in contact with the first planar side of the first electrode sub-assembly and with a second planar side of the second electrode sub-assembly.

13. A system for a high-performance prismatic lithium-ion battery cell, the system comprising:
a battery cell stack including:
a first electrode sub-assembly including a plurality of pairs of anode electrodes and cathode electrodes and including a first planar side;
a first polymeric shell disposed around the first electrode sub-assembly and configured for providing mechanical protection and electrical insulation to the first electrode sub-assembly;
a first metal foil sheet attached to the first polymeric shell and disposed next to and in contact with the first planar side of the first electrode sub-assembly;
a second electrode sub-assembly including a second planar side;
a second polymeric shell disposed around the second electrode sub-assembly; and
a second metal foil sheet in contact with the second polymeric shell and disposed next to and in contact with the second planar side of the second electrode sub-assembly; and
wherein the first planar side of the first electrode sub-assembly is adjacent to the second planar side of the second electrode sub-assembly;
wherein a center portion of the battery cell stack is defined between the first electrode sub-assembly and the second electrode sub-assembly;
wherein the first metal foil sheet is in contact with the first planar side of the first electrode sub-assembly in the center portion;
wherein the second metal foil sheet is in contact with the second planar side of the second electrode sub-assembly in the center portion;
wherein the first polymeric shell and the second polymeric shell collectively encapsulate the first electrode sub-assembly and the second electrode sub-assembly; and
wherein the first metal foil sheet and the second metal foil sheet are configured for collectively exchanging heat with the first electrode sub-assembly and the second electrode sub-assembly.

14. The system of claim 13, further comprising an enclosure including a metal can configured to receive the battery cell stack therewithin; and
wherein the first metal foil sheet and the second metal foil sheet contact the metal can and are configured for exchanging heat with the metal can.

15. The system of claim 13, wherein the first metal foil sheet includes a first adhesive strip configured for attachment to the first electrode sub-assembly; and
wherein the second metal foil sheet includes a second adhesive strip configured for attachment to the second electrode sub-assembly.

16. The system of claim 13, wherein the first polymeric shell includes a first adhesive strip configured for attachment to the first electrode sub-assembly; and
wherein the second polymeric shell includes a second adhesive strip configured for attachment to the second electrode sub-assembly.

17. The system of claim 13, wherein adhesive is used to adhere an entirety of a contact area between the first polymeric shell and the first electrode sub-assembly.

18. The system of claim 13, further comprising an enclosure including a polymeric pouch configured to receive the battery cell stack therewithin.

19. A method for a high-performance prismatic lithium-ion battery cell, the method comprising:
creating crease lines upon a polymeric shell in order to create a bottom portion of the polymeric shell, a retention tab on a first side of the bottom portion, and an outer vertical portion on a second side of the bottom portion;
disposing the polymeric shell on top of a metal foil sheet such that the polymeric shell and the metal foil sheet are in a horizontal orientation;
disposing an electrode sub-assembly including a first planar side and a second planar side upon the bottom portion, wherein the first planar side and the second planar side are in a vertical orientation;
folding the retention tab and an inner vertical portion of the metal foil sheet up along the first planar side of the electrode sub-assembly, wherein the metal foil sheet extends past the retention tab and contacts the first planar side of the electrode assembly;
adhering the inner vertical portion to the first planar side;
folding the outer vertical portion of the polymeric shell and an outer vertical portion of the metal foil sheet up along the second planar side of the electrode sub-assembly; and
adhering the outer vertical portion of the polymeric shell to the second planar side of the electrode sub-assembly; and
wherein the metal foil sheet is configured for transferring heat away from the first planar side of the electrode sub-assembly.

20. The method of claim 19, wherein the polymeric shell includes a first polymeric shell;
wherein the metal foil sheet includes a first metal foil sheet;
wherein the electrode sub-assembly includes a first electrode sub-assembly; and
further comprising:
creating a second set of crease lines upon a second polymeric shell in order to create a second bottom portion of the second polymeric shell, a second retention tab of the second polymeric shell on a first side of the second bottom portion of the second polymeric shell, and a second outer vertical portion of the second polymeric shell on a second side of the second bottom portion of the second polymeric shell;
disposing the second polymeric shell on top of a second metal foil sheet;
disposing a second electrode sub-assembly including a third planar side and a fourth planar side upon the second bottom portion of the second polymeric shell;
folding the second retention tab of the second polymeric shell and a second inner vertical portion of the second metal foil sheet up along the third planar side of the second electrode sub-assembly, wherein the second metal foil sheet extends past the second retention tab of the second polymeric shell and contacts the third planar side of the second electrode assembly;

adhering the second inner vertical portion of the second metal foil sheet to the third planar side;

folding the second outer vertical portion of the second polymeric shell and a second outer vertical portion of the second metal foil sheet up along the fourth planar side of the second electrode sub-assembly;

adhering the second outer vertical portion of the second polymeric shell to the fourth planar side of the second electrode sub-assembly; and disposing the second electrode sub-assembly so that the third planar side of the second electrode sub-assembly is adjacent to the first planar side of the first electrode sub-assembly; and wherein the first metal foil sheet and the second metal foil sheet are configured for transferring heat away from a central portion between the first electrode sub-assembly and the second electrode sub-assembly.

* * * * *